Nov. 2, 1937.  E. L. SCHAUB  2,097,778
FILM REEL CONSTRUCTION
Filed July 28, 1934
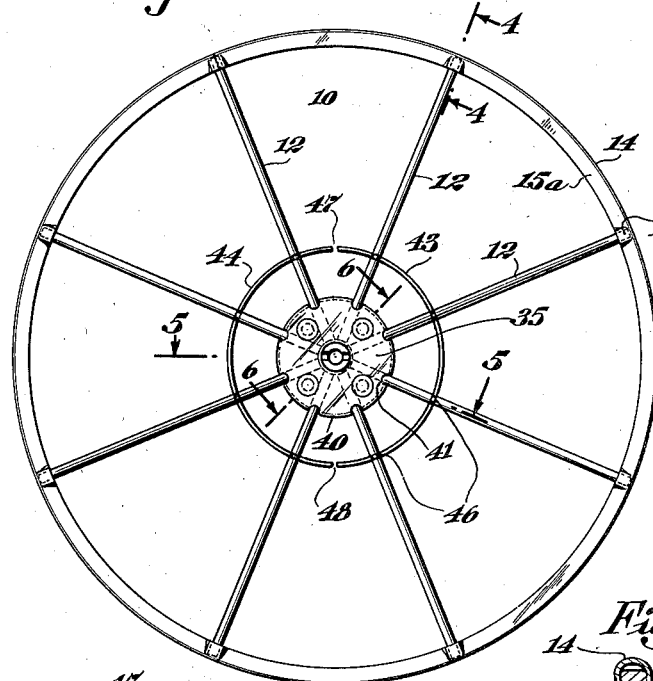
Fig. 1
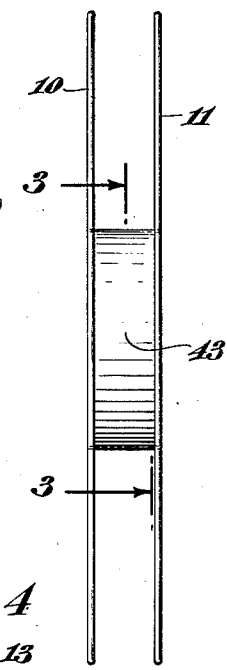
Fig. 2
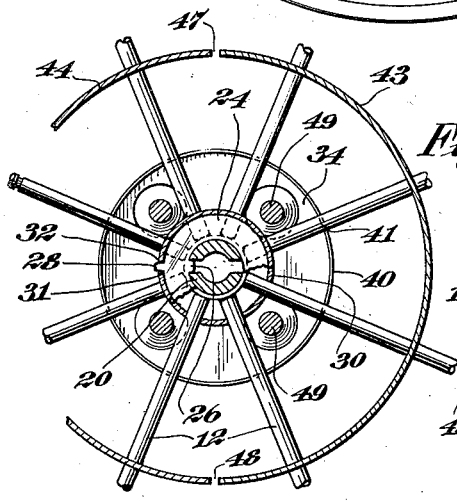
Fig. 3
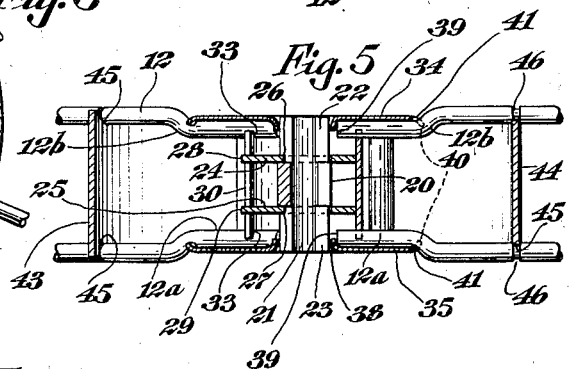
INVENTOR,
Eugene Louis Schaub,
BY
his ATTORNEY.

Patented Nov. 2, 1937

2,097,778

UNITED STATES PATENT OFFICE 2,097,778

FILM REEL CONSTRUCTION

Eugene Louis Schaub, Middle Village, Long Island, N. Y., assignor to Frank Ackerman and Herman Gould, New York, N. Y., a copartnership Application July 28, 1934, Serial No. 737,371

12 Claims. (Cl. 242—70)

This invention relates to film reel construction, more particularly, motion picture film reels.

It is an object of my invention to provide a reel construction particularly useful in connection with professional motion picture projectors for purposes of holding large lengths of motion picture films and to combine in this construction, constituting the reel, lightness of weight and rigidity by structural details which will effect a high order of economy in manufacturing and assembling the constituent parts.

Other objects of my invention reside in the provision of a film reel having constructional features combining lightness of weight with necessary rigidity and strength by including as detailed elements thereof parts which may be formed by simple metal stamping operations, while providing a proper balance, accessibility to the hub forming portion for facilitating handling and threading of the film, with freedom from obstructing parts which may entail a hazard in the handling of the film reel and the film mounted thereon, by the operator.

To attain these objects as may appear herein or be hereinafter pointed out, I make reference to the accompanying drawing, forming a part hereof, in which—

Figure 1 is a plan view of my device;

Figure 2 is a side elevation thereof;

Figure 3 is a section taken on the line 3—3 of Figure 2;

Figure 4 is an enlarged detailed sectional view taken on the line 4—4 of Figure 1;

Figure 5 is an enlarged fragmentary section taken on the line 5—5 of Figure 1;

Figure 6 is an enlarged fragmentary section taken on the line 6—6 of Figure 1.

Making reference to the drawing, my invention comprises, generally, a film reel formed from skeleton end flanges united to a hub assembly. The flanges are formed of wire spokes seated in a rolled peripheral rim, providing spaced side walls for locating the spokes seated therein, in addition to providing a stiff and rigid rim of smooth and continuous outline. The spaced walls of the rim, as rolled, key and anchor the outer edges of the spokes, avoiding the necessity of spot-welding, heretofore used, and superior thereto in view of the ease with which the assembly may be effected and, in addition, to the feature of eliminating the necessity for trimming and polishing at the terminals of the spokes and the rim.

The hub assembly comprises an axial keying member spaced between tie plates, both of which may be stamped or rolled and cooperate with a spacer of pressed and rolled sheet metal which keys the centrally located ends of the spokes to this assembly. By this assembly, a wind-up substantially cylindrical spacer may be disposed between the flanges and be readily accessible for threading the film to be wound thereon. All of the parts may be assembled by punch pressing operations, requiring no welding operations to provide a rigid, as well as light weight, film reel construction.

Referring more specifically to the drawing, my film reel, in the preferred embodiment of my invention, comprises end flanges 10 and 11, each of which is formed from wire spokes 12, the outer ends whereof 13, are set into a rim 14.

For the provision of the rim, a sheet of metal is rolled to provide spaced walls 15 and 16. The continuous ring is concluded by brazing together the ends of the strip from which the rim is made, at some point, preferably adjacent one of the spokes, for securely holding the brazed section together by reason of the connection between the spoke 12 and the rim 14, by constructional details which will appear more clearly as this description proceeds.

Each of the spokes, at its outer end, is preferably formed with a neck 17, tapered downwardly somewhat, and terminating into shoulders 18.

With the spokes thus provided and constructed, the necks 17 are inserted between the side walls 15 and 16 of the rim 14. With the spokes thus evenly and uniformly distributed, the wall 15 is pressed down so that the section 15a between adjacent spokes substantially contacts with the end of the wall 16, as more clearly appearing from the section in dotted line in Figure 4, thus providing pockets 19, enveloping the necks 17 of the spokes 12. The necks having been constricted adjacent the shoulders 18, lateral displacement of the spokes from the rim and in a radial direction is avoided, in an effective manner.

Thus, a clean, smooth and continuous rim is provided, with the spokes thereof inter-locked and of unusual rigidity as formed by the depth of the flange formed from side walls 15a and 16.

Having thus provided a rim and spoke assembly forming the side flanges 10 and 11, these side flanges may now be assembled with the hub assembly.

Either before assembling the spokes 12 with the rim 14, or after the assembly has been effected, the inner ends of the spokes 12 are provided with an offset section 12a by the bend 12b, for purposes which will more clearly appear as this description proceeds.

With the flange members 10 and 11, as thus described, provided, there is then assembled a spindle and hub assembly. This is accomplished by forming a spindle 20, preferably by rolling a flat sheet into tubular form, to provide a central orifice 21 centrally of the cylindrical walls formed by the tubular section, to receive the reel shaft of either the motion picture machine or the winding device. Keying slots 22 and 23 are then formed into the sleeve 20. Thereafter, a pair of disks 24 and 25, centrally orificed to correspond to the diameter of the sleeve 20 with a driving fit, are provided and these disks include inwardly directed lugs 26 and 27, extending into the key slots 22 and 23, respectively.

The disks 24 and 25, adjacent the periphery thereof, are provided with outwardly extending lugs 28 and 29, respectively.

There is then provided a cold rolled, cylindrically shaped, spacer member 30, which forms a spring fit over the periphery of the disks 24 and 25, with the terminal edges 31 and 32 abutting the lugs 28 and 29 of these disks.

The ends of the spacer member 30 are formed with substantially semi-circular slots 33, in number corresponding to the spokes of the side flanges 10 and 11 and to form snug engagement with the contour of the outline of the spokes 12 thereof.

Each flange 10 and 11 is then provided with a side plate 34 and 35, formed centrally thereof with an orifice 36 and 37, respectively, including an inwardly dished portion 38, against which the inner end 39 of the spokes 12 abut with frictional engagement.

The side plates 34 and 35 are dished by rolling the rim 40 thereof, and its dimensions are such as to fit the plates to the bends 12b formed in the spokes 12. In this dished rim there is formed cut-outs 41, snugly engaging the spokes at the offset portion or bends 12b thereof, and lying substantially at right angles to the length of the section 12b.

The plates are formed with a plurality of countersunk orifices 42, spaced so as to lie between pairs of the spokes 12.

Each of the flanges 10 and 11, carrying the side plates 35 and 34 is then assembled with the hub assembly by driving the tubular spindle 20 through the orifices 36 and 37, respectively, with a driving fit.

Before driving the spindle 20 through the orifices 36 and 37 for the full distance, there are interposed between the flanges 10 and 11, additional spacer members and a film receiving or windup cylinder formed of a section 43 and section 44, each of which sections is formed with notches 45, enveloping the spokes for substantially the entire diameter thereof. Preferably, the spokes are formed with notches 46 to make keying engagement with the film receiving or windup cylinder comprising the sections 43 and 44, respectively.

The notches 46 in the spokes 12, may be previously formed or formed as a result of a driving action of the spokes into the notches 45 formed in the sections 43 and 44 by a pressing operation.

It will be observed that the sections 43 and 44 are substantially semi-circular in cross section and are spaced from each other, to provide openings 47 and 48 which are adapted to receive one end of the film to facilitate the threading of the film upon the film or windup cylindrical section formed by the members 43 and 44 to start the winding of the film.

Complete assembly of the hub to the flanges 10 and 11 is now effected by further pressing the side plates 34 and 35 towards each other and in this position, rivets 49 are projected through the orifices 42 of the plate 35 and extended into the orifices of the plate 34. In this position, the heads 50 of the rivets are upset or spun into engagement with the countersunk orifices 42, formed in the plate 34.

It will thus be observed that I have provided a film reel in which the parts thereof are constructed by simple operations and an assembly may be provided which combines lightness in weight with rigidity of construction.

It will be evident that various changes can be made in the form of the parts without departing from the scope of the invention which is outlined in the appended claims.

Having thus described my invention and illustrated its use, what I claim as new and desire to secure by Letters Patent is—

1. A film reel comprising in combination, side flanges comprising a ring-shaped rim and including wire spokes, the peripheral ends whereof are connected to and included within said ring-shaped rim, portions of said spokes adjacent the axial ends thereof being offset, a hub assembly for the axial ends including a cylindrical spacer, and side plates positioned in the plane of said offset portions of said spokes, including seats for said spokes.

2. A film reel comprising in combination, side flanges comprising a ring-shaped rim and including wire spokes, the peripheral ends whereof are connected to and included within said ring-shaped rim, portions of said spokes adjacent the axial ends thereof being offset, a hub assembly for the axial ends including a cylindrical spacer, and side plates positioned in the plane of said offset portions of said spokes, including seats for said spokes, a spindle member through said plates including a keying slot, and keying members between said spindle and spacer.

3. A film reel comprising in combination, side flanges comprising a ring-shaped rim and including wire spokes, the peripheral ends whereof are connected to and included within said ring-shaped rim and being formed adjacent their axial ends with offset portions, a hub assembly for the axial ends including a cylindrical spacer, and side plates positioned in the plane of said offset portions of said spokes, including seats for said spokes.

4. A film reel comprising in combination, side flanges comprising a ring-shaped rim and including wire spokes, the peripheral ends whereof are connected to and included within said ring-shaped rim, the axial ends being connected to a hub assembly comprising side plates and a spacer between which said axial ends are disposed, a tubularly formed spindle member disposed transversely to said plates at their axial portions, and keying members engaging said spindle and spacer to each other.

5. A film reel comprising in combination, side flanges comprising a ring-shaped rim and including wire spokes, the peripheral ends whereof are connected to and included within said ring-shaped rim, the axial ends being connected to a hub assembly comprising side plates and a spacer member between which said axial ends are disposed, a rolled tubular spindle formed with keying slots transversely connected to said plates, a disk member enveloping said spindle and including keying connection with said spindle and spacer, and tie members holding said plates and spokes to each other.

6. A film reel comprising in combination, side flanges comprising a ring-shaped rim and including wire spokes, the peripheral ends whereof are connected to and included within said ring-shaped rim, the axial ends being connected to a hub assembly including side plates and tie members holding said ends to and including a spacer member, and a cylindrically formed film seat between said side flanges, means on said spokes concentrically spacing said film seat in relation to said hub assembly.

7. A film reel comprising in combination, side flanges comprising a ring-shaped rim and including wire spokes, the peripheral ends whereof are seated in and included within said ring-shaped rim the axial ends being connected to a hub assembly including side plates and a spacer member connected to each other and said spokes by rivet tie members, a film seat comprising semi-cylindrically rolled sheets, spaced from said hub assembly and each other to provide accessible film threading of said film seat, notched portions on the ends of said sheets engaging said spokes for holding said film seat in position on said spokes between said flanges.

8. A film reel comprising in combination, side flanges comprising a ring-shaped rim and including wire spokes, the peripheral ends whereof are seated in and included within said ring-shaped rim, the axial ends being connected to a hub assembly including side plates and a spacer member connected to each other and said spokes by rivet tie members, a film seat comprising semi-cylindrically rolled sheets, spaced from said hub assembly and each other to provide accessible film threading of said film seat, notched portions on the ends of said sheets and spokes for holding said film seat in position on said spokes between said flanges.

9. In a film reel, a side flange construction therefor, comprising spoke members and a rim of sheet material rolled to bend the same and forming spaced walls of uniform material, portions of which are substantially U-shaped in cross section and in which portions the ends of the spoke members are seated, the rim being formed with a smooth exterior whereby it may be used for hand contact in rotation.

10. In a film reel, a side flange construction therefor comprising wire spoke members, and a ring-shaped rim formed with spaced members of uniform material substantially U-shaped in cross section along portions thereof and in which portions the ends of said spoke members are seated, the rim being formed with a smooth exterior whereby it may be used for hand contact in rotation.

11. In a film reel, a side flange construction therefor, comprising wire spoke members and a ring-shaped rim rolled of sheet material into spaced walls of uniform material having a substantially U-shaped cross section at portions thereof, tapering neck portions formed adjacent the ends of said spokes, said ends being disposed in the aforesaid portions of the spaced walls of said rims, one of said walls being crimped inwardly to surround the tapering neck of said spokes, the rim being formed with a smooth exterior whereby it may be used for hand contact in rotation.

12. In a film reel, a side flange construction therefor, comprising spoke members and a rolled ring-shaped rim forming spaced walls of uniform material having portions thereof substantially U-shaped in cross section and in which portions the ends of said spokes are seated, one of said walls of said rim being crimped inwardly between the spokes to house said spokes against lateral displacement, the rim being formed with a smooth exterior whereby it may be used for hand contact in rotation.

EUGENE LOUIS SCHAUB.